United States Patent
Ota

(10) Patent No.: US 9,817,263 B2
(45) Date of Patent: Nov. 14, 2017

(54) LIQUID CRYSTAL DISPLAY

(71) Applicant: Mitsubishi Electric Corporation, Tokyo (JP)

(72) Inventor: Hisatomo Ota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 5 days.

(21) Appl. No.: 14/526,641

(22) Filed: Oct. 29, 2014

(65) Prior Publication Data

US 2015/0131025 A1    May 14, 2015

(30) Foreign Application Priority Data

Nov. 13, 2013  (JP) ................................. 2013-234766

(51) Int. Cl.
*G02F 1/1333* (2006.01)
*G02F 1/1335* (2006.01)
*G02F 1/1339* (2006.01)

(52) U.S. Cl.
CPC .... *G02F 1/133512* (2013.01); *G02F 1/13394* (2013.01); *G02F 2001/133388* (2013.01)

(58) Field of Classification Search
CPC ...................... G02F 1/133514; G02F 1/133512
See application file for complete search history.

(56) References Cited

U.S. PATENT DOCUMENTS

| 6,281,960 B1* | 8/2001 | Kishimoto ........ G02F 1/133377 349/110 |
| 6,414,733 B1* | 7/2002 | Ishikawa ............... G02F 1/1339 349/106 |
| 6,705,584 B2* | 3/2004 | Hiroshima .......... G02F 1/13394 249/155 |

(Continued)

FOREIGN PATENT DOCUMENTS

| JP | 2000-66181 A | 3/2000 |
| JP | 2000-066181 A | 3/2000 |

(Continued)

OTHER PUBLICATIONS

An Office Action issued by the Japanese Patent Office dated Jul. 18, 2017, which corresponds to Japanese Patent Application No. 2013-234766 and is related to U.S. Appl. No. 14/526,641; with English language translation.

*Primary Examiner* — Phu Vu
(74) *Attorney, Agent, or Firm* — Studebaker & Brackett PC

(57) ABSTRACT

A liquid crystal display includes: a TFT array substrate; a counter substrate; a black matrix located on a surface of the counter substrate on the TFT-array-substrate side, the black matrix having, in a display region in which the pixels are disposed, a plurality of first openings formed at positions corresponding to the pixels, the black matrix being formed in a solid manner in a non-display region that is a periphery of the display region and is adjacent to the display region; a color material layer located on the counter substrate through (Continued)

the plurality of first openings and on the black matrix, the color material layer being formed in a solid manner in the display region and being formed to have the plurality of second openings as dummies in the non-display region; and a plurality of columnar spacers extended between the color material layer and the TFT array substrate.

10 Claims, 14 Drawing Sheets

(56) References Cited

U.S. PATENT DOCUMENTS

| | | | | |
|---|---|---|---|---|
| 6,819,391 B2* | 11/2004 | Kim | ................... | G02F 1/1339 349/156 |
| 7,061,569 B2* | 6/2006 | Yun | ................... | G02F 1/13394 349/156 |
| 7,113,248 B2* | 9/2006 | Chung | ................... | G02F 1/1339 349/110 |
| 7,202,931 B2* | 4/2007 | Chung | ................... | G02F 1/1339 349/106 |
| 7,333,167 B2* | 2/2008 | Kawase | ................... | G02B 5/201 349/106 |
| 7,821,612 B2* | 10/2010 | Koo | ................... | G02F 1/133514 349/106 |
| 7,884,900 B2* | 2/2011 | Doi | ................... | G02F 1/133512 349/106 |
| 8,421,964 B2* | 4/2013 | Gotoh | ................... | G02F 1/133514 349/106 |
| 9,057,905 B2 | 6/2015 | Liu et al. | | |
| 9,057,908 B2 | 6/2015 | Liu et al. | | |
| 2003/0103185 A1* | 6/2003 | Kim | ................... | G02F 1/1339 349/156 |
| 2004/0017538 A1* | 1/2004 | Yun | ................... | G02F 1/13394 349/187 |
| 2005/0253994 A1 | 11/2005 | Kamijima et al. | | |
| 2010/0128207 A1* | 5/2010 | Hwang | ................... | G02F 1/13454 349/106 |
| 2012/0057111 A1* | 3/2012 | Ohkubo | ................... | G02F 1/1339 349/106 |
| 2013/0155537 A1 | 6/2013 | Liu et al. | | |

FOREIGN PATENT DOCUMENTS

| | | |
|---|---|---|
| JP | 2001-133787 A | 5/2001 |
| JP | 2005-326577 A | 11/2005 |
| JP | 2006-267334 A | 10/2006 |
| JP | 2006-337590 A | 12/2006 |
| JP | 2007-171560 A | 7/2007 |
| JP | 2008-250094 A | 10/2008 |

* cited by examiner

F I G . 1
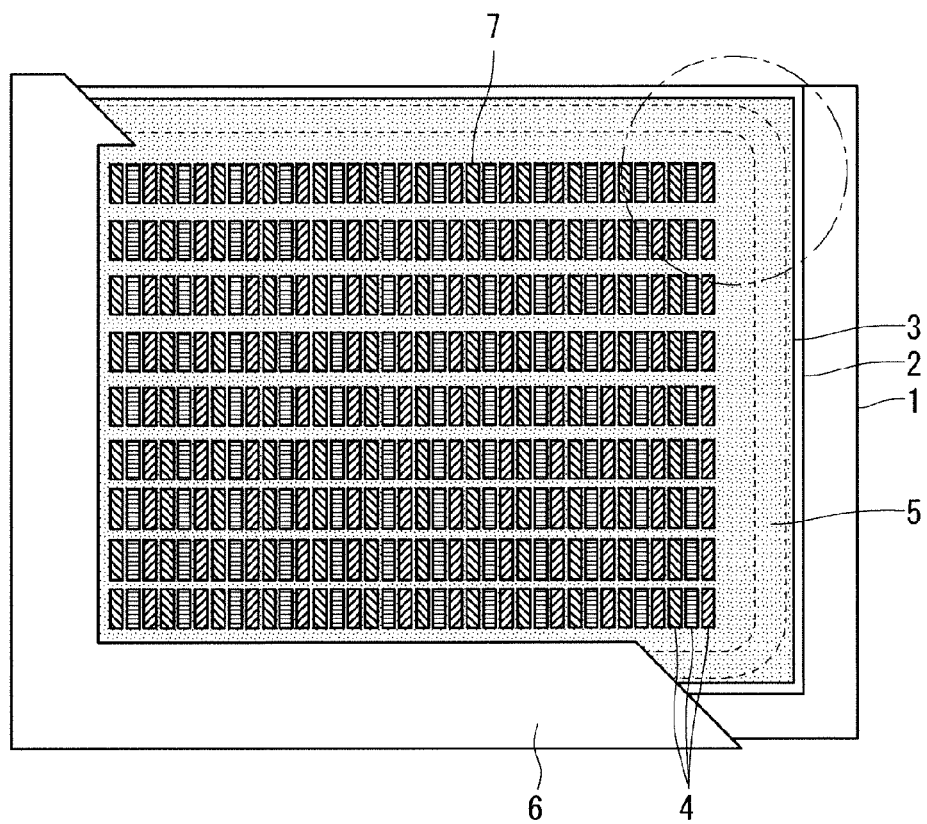

F I G . 2
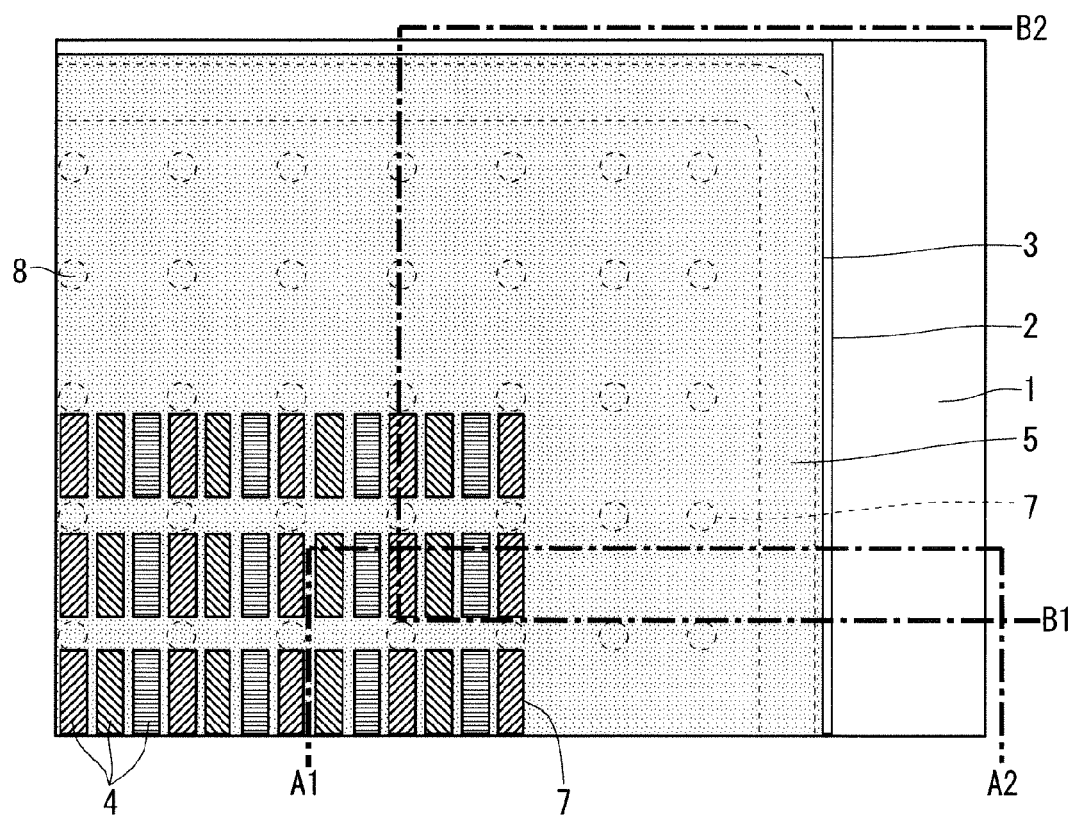

F I G . 3
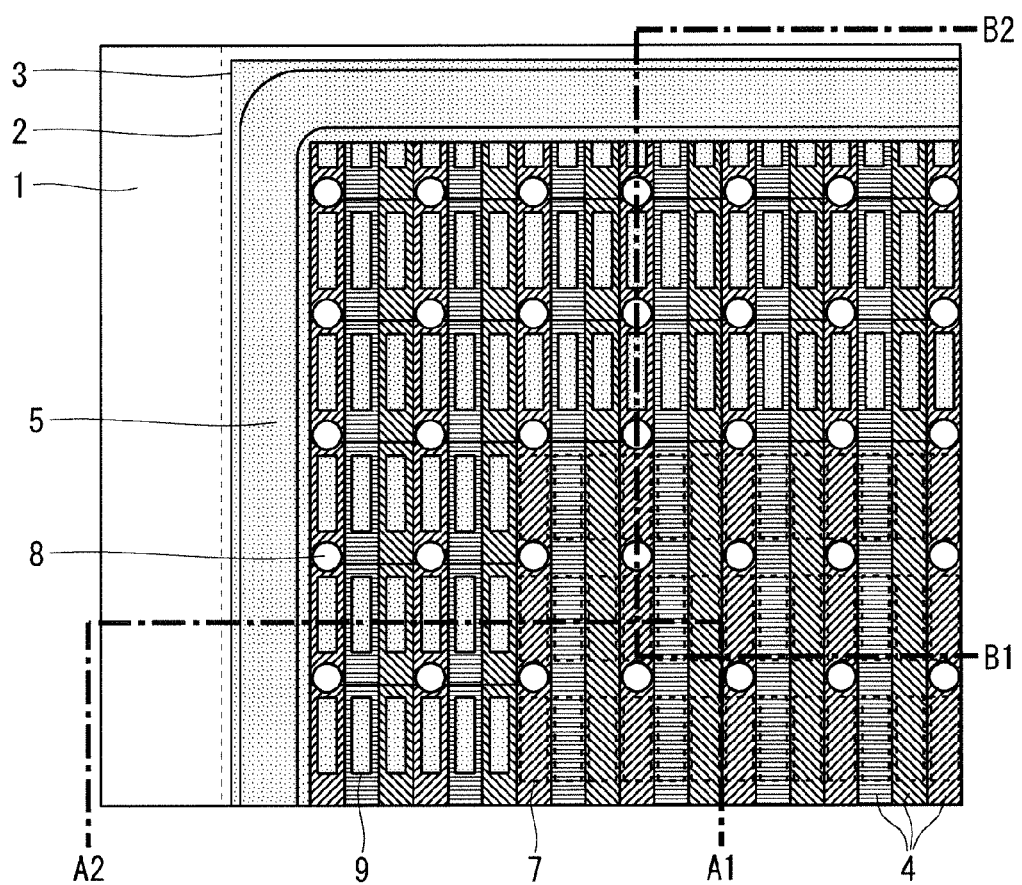

F I G . 8
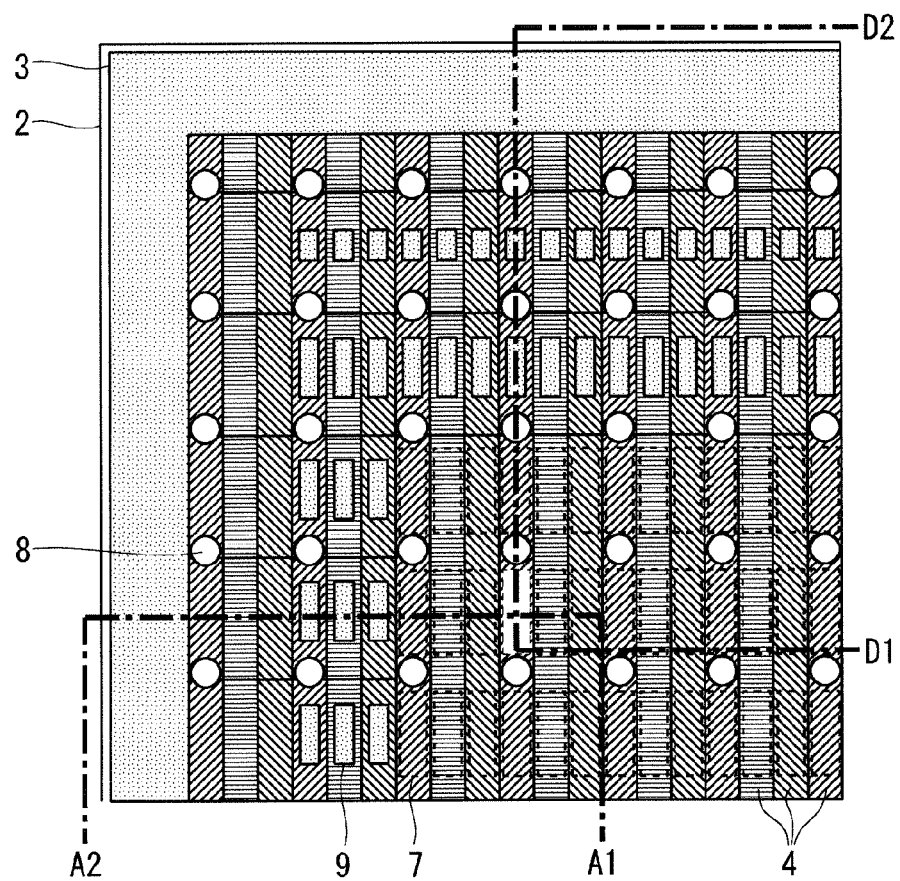
F I G . 9
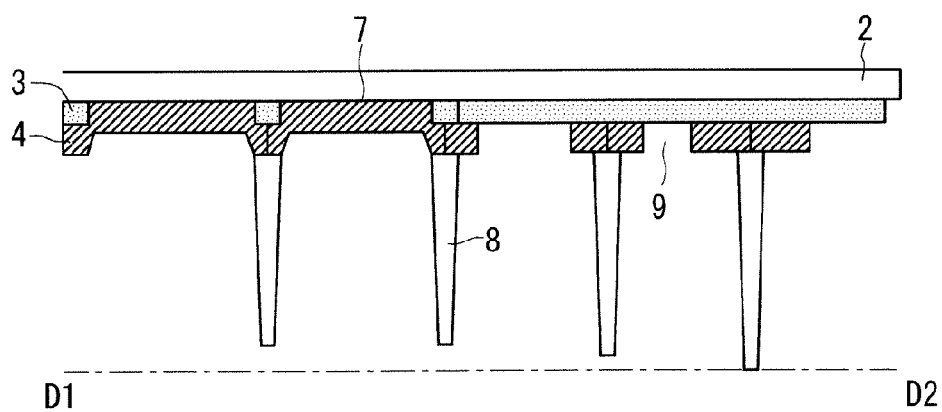

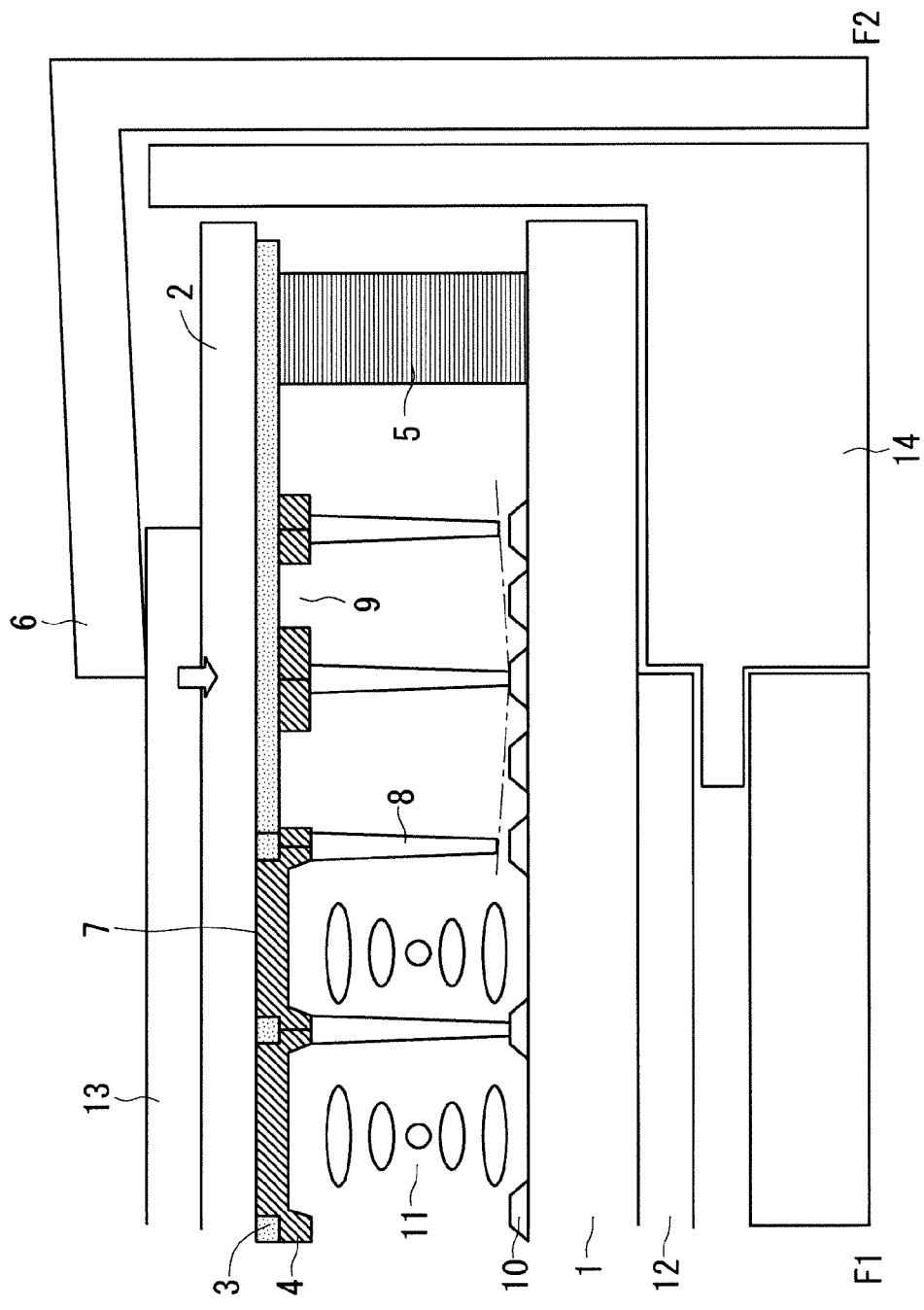

F I G . 1 4
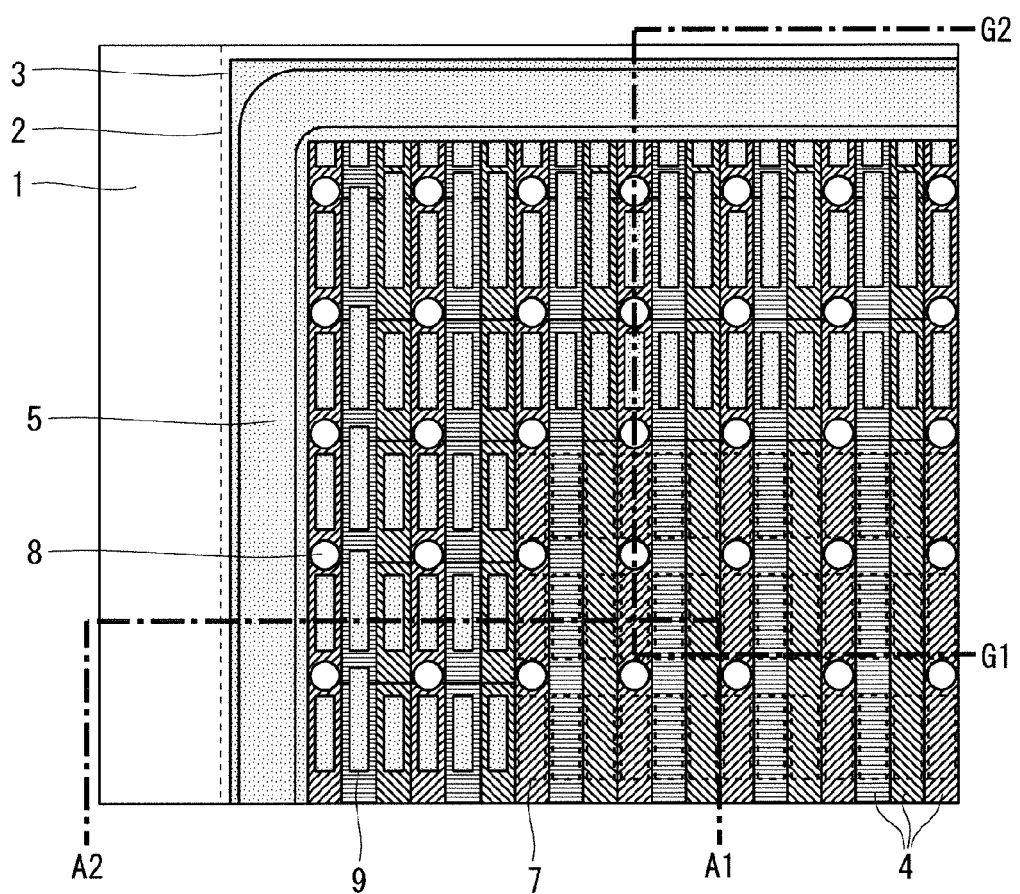

LIQUID CRYSTAL DISPLAY

BACKGROUND OF THE INVENTION

Field of the Invention

The present invention relates to a liquid crystal display.

Description of the Background Art

In recent years, as the semiconductor technology progresses, development has been proceeding on the information systems and the information devices having higher performance, and there, the image has been playing an increasingly important role as a human interface. As the human interfaces, information displays that display information are utilized in various situations, leading to a demand for higher-performance and higher-quality information displays. Particularly in liquid crystal displays (LCDs) including the constituent components that are in a liquid state and thus can be easily deformed, keeping the uniformity of liquid crystal layer is an important challenge.

One example of the human interfaces is a device that includes an input unit such as a touch panel disposed on the front surface of a liquid crystal display and is operated by a user touching a display screen, and such a device has been widely used. In the above device, when a user touches the display screen, an external force (pressing force) is applied onto the liquid crystal display in some cases. Even in such a case, the uniform displaying needs to be kept without causing interference with the display characteristics.

In a liquid crystal display such as the one described above, the liquid crystal cell in which liquid crystals are sandwiched between the substrates disposed to be opposed to each other often has the structure in which a number of the columnar spacers (also referred to as post spacers (PSs)) formed by photolithography are aligned in the cell, to thereby hold the gap between the substrates. The columnar spacers are expected to keep the thickness of the liquid crystal layer (corresponding to the gap between the substrates and hereinafter being also referred to as cell gap) uniform at least in the display region that is the region contributing to the displaying and to prevent the cell gap from varying even in a case where an external force is applied or external vibrations occur.

The display defects caused by the abnormality of the cell gap mainly include the followings. Specifically, when the cell gap is not kept uniform in the display region, the transmission properties of light becomes different at different positions, thereby causing unevenness in display brightness, which is visually recognized as display unevenness. In addition, when the cell gap varies due to application of an external force or external vibrations, the cell gap is visually recognized as dynamic display unevenness (so-called puddling) that is different at different moments and at different positions in the display region.

The cell gap should be kept uniform in the display region. However, when the cell gap in the peripheral frame region (that is the non-display region adjacent to the periphery of the display region and is hereinafter referred to as non-display region) deviates significantly from the cell gap in the display region or changes, the cell gap especially in the peripheral portion (the vicinity of the peripheral frame region) of the display region is indirectly affected. Consequently, the cell gap in the peripheral portion of the display region cannot be kept in a desired state, thereby interfering with the display characteristics.

Therefore, to prevent the display defects such as display unevenness and puddlings in the display region, the cell gap in the display region and the non-display region needs to be kept uniform and to be prevented from changing.

Conventionally, the following liquid crystal display panel has been disclosed (see, for example, Japanese Patent Application Laid-Open No. 2001-133787). The liquid crystal display panel includes the columnar spacers provided not only in the display region but also in the non-display region and the dummy color material layer (the colored layer formed as the exclusive layer for the columnar resin spacers to be laminated thereon) provided in the portion of the non-display region on which the columnar spacers are to be placed. The color material layer is provided to eliminate the difference in the heights (equalize the heights) of the portions of the substrate surface on which the columnar spacers are to be placed in the non-display region and the display region.

There has been disclosed a method for uniforming the cell gap throughout the entire range of the non-display region and the display region (see, for example, Japanese Patent Application Laid-Open No. 2006-337590). In this method, the shapes of the projections and recesses of the surface formed of the color material layer and the light-shielding layer (black matrix (BM)) are approximated to be identical in the non-display region and the display region, and then, the planarization layer made of, for example, a resin film is formed on the surface.

In Japanese Patent Application Laid-Open No. 2001-133787, by providing the color material layer having the same thickness in the non-display region and the display region, the heights of the portions of the substrate surface on which the columnar spacers are to be placed are set to be equal, which is effective in uniforming the cell gap in the non-display region and the display region. However, the height of the columnar spacers placed in the non-display region and the height of the columnar spacers placed in the display region unfortunately differ from each other.

Specifically, to form the columnar spacers on the substrate side, the color material layer such as the color resist pattern is formed, and then, the resin film formed by applying a resin on the color material layer is patterned by photolithography. If the projections and recesses of the surface serving as an underlayer have different shapes, the resin film unfortunately cannot be formed into the same thickness. Therefore, the resin spacers formed by processing such a resin film also have different thicknesses (heights).

As described above, the projections and recesses of the portions of the surface serving as the underlayer on which the columnar spacers are to be placed have different shapes in the display region in which the openings are to be formed in the light-shielding layer and in the non-display region in which the light-shielding layer is formed overall, whereby the height of the columnar spacers placed in the non-display region and the height of the columnar spacers placed in the display region differ from each other. Particularly, in a case where the resin light-shielding film in which the light-shielding layer is formed to be relatively thick (the light-shielding film formed with the black particles dispersed in the resin) is included, the difference in the shapes of the projections and recesses greatly affects the columnar spacers, causing significant difference in the height of the columnar spacers. Therefore, in the non-display region, the columnar spacers that are identical to the columnar spacers in the display region cannot be formed, whereby the cell gap in the display region and the non-display region cannot be kept uniform nor be prevented from changing. That is, the display defects such as display unevenness and puddling in the display region have not been sufficiently prevented.

Meanwhile, in Japanese Patent Application Laid-Open No. 2006-337590, the arrangement of the columnar spacers is not disclosed. Therefore, if the columnar spacers are not appropriately disposed in the display region and thus the gap between the substrates are not held by the columnar spacers, the cell gap is changed due to application of an external force or external vibrations. Thus, Japanese Patent Application Laid-Open No. 2006-337590 does not disclose at least a method for effectively preventing the display defects such as the puddling caused by application of an external force or external vibrations. Unfortunately, the structure for obtaining overall flattening by using the planarization layer made of, for example, the resin film is relatively costly.

SUMMARY OF THE INVENTION

The present invention has an object to provide a liquid crystal display capable of preventing display defects even in a case where an external force is applied or external vibrations occur.

A liquid crystal display according to the present invention includes: an array substrate having an array of a plurality of pixels; a counter substrate located opposite to the array substrate; a light-shielding layer located on a surface of the counter substrate on the array substrate side, the light-shielding layer having, in a display region in which the pixels are disposed, a plurality of first openings formed at positions corresponding to the pixels, the light-shielding layer being formed in a solid manner in a non-display region that is a periphery of the display region and is adjacent to the display region; a color material layer located on the counter substrate through the plurality of first openings and on the light-shielding layer, the color material layer being formed in a solid manner in the display region and being formed to have a plurality of second openings as dummies in the non-display region; and a plurality of columnar spacers extended between the color material layer and the array substrate.

The liquid crystal display according to the present invention includes: an array substrate having an array of a plurality of pixels; a counter substrate located opposite to the array substrate; a light-shielding layer located on a surface of the counter substrate on the array substrate side, the light-shielding layer having, in a display region in which the pixels are disposed, a plurality of first openings formed at positions corresponding to the pixels, the light-shielding layer being formed in a solid manner in a non-display region that is a periphery of the display region and is adjacent to the display region; a color material layer located on the counter substrate through the plurality of first openings and on the light-shielding layer, the color material layer being formed in a solid manner in the display region and being formed to have a plurality of second openings as dummies in the non-display region; and a plurality of columnar spacers extended between the color material layer and the array substrate, whereby display defects can be prevented even in a case where an external force is applied or external vibrations occur.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a plan view showing one example of a configuration of a liquid crystal display panel of a liquid crystal display according to a first preferred embodiment of the present invention;

FIG. 2 is a plan view enlarging a part of the liquid crystal display panel according to the first preferred embodiment of the present invention;

FIG. 3 is a plan view of FIG. 2 as viewed from a TFT-array-substrate side;

FIG. 8 is a plan view showing another example of a part of the liquid crystal display panel according to the second preferred embodiment of the present invention as viewed from the TFT-array-substrate side;

FIG. 9 is a cross-sectional view taken along the line D1-D2 in FIG. 8;

FIG. 13 is a cross-sectional view taken along the line F1-F2 in FIG. 12;

FIG. 14 is a plan view showing one example of a part of a liquid crystal display panel according to a fifth preferred embodiment of the present invention as viewed from the TFT-array-substrate side.

DESCRIPTION OF THE PREFERRED EMBODIMENTS

Preferred embodiments of the present invention are described below with reference to the drawings.

Although an active matrix liquid crystal display including thin film transistors (hereinafter referred to as TFTs) as switching elements is described as an example of liquid crystal displays according to the preferred embodiments of the present invention, switching elements other than TFTs may be employed.

First Preferred Embodiment

Figure 4:
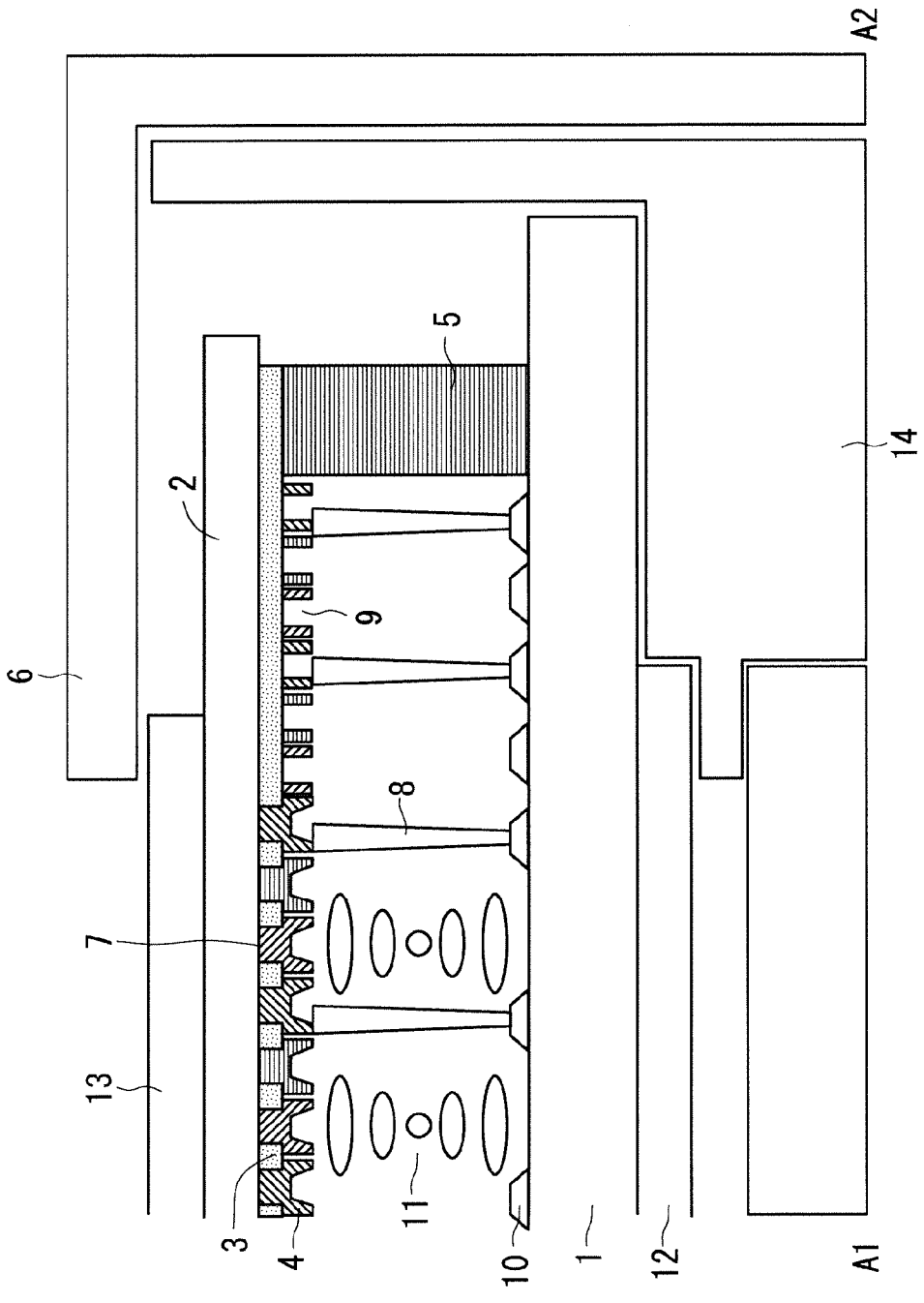
FIG. 4 is a cross-sectional view taken along the line A1-A2 in FIGS. 2 and 3.
Figure 5:
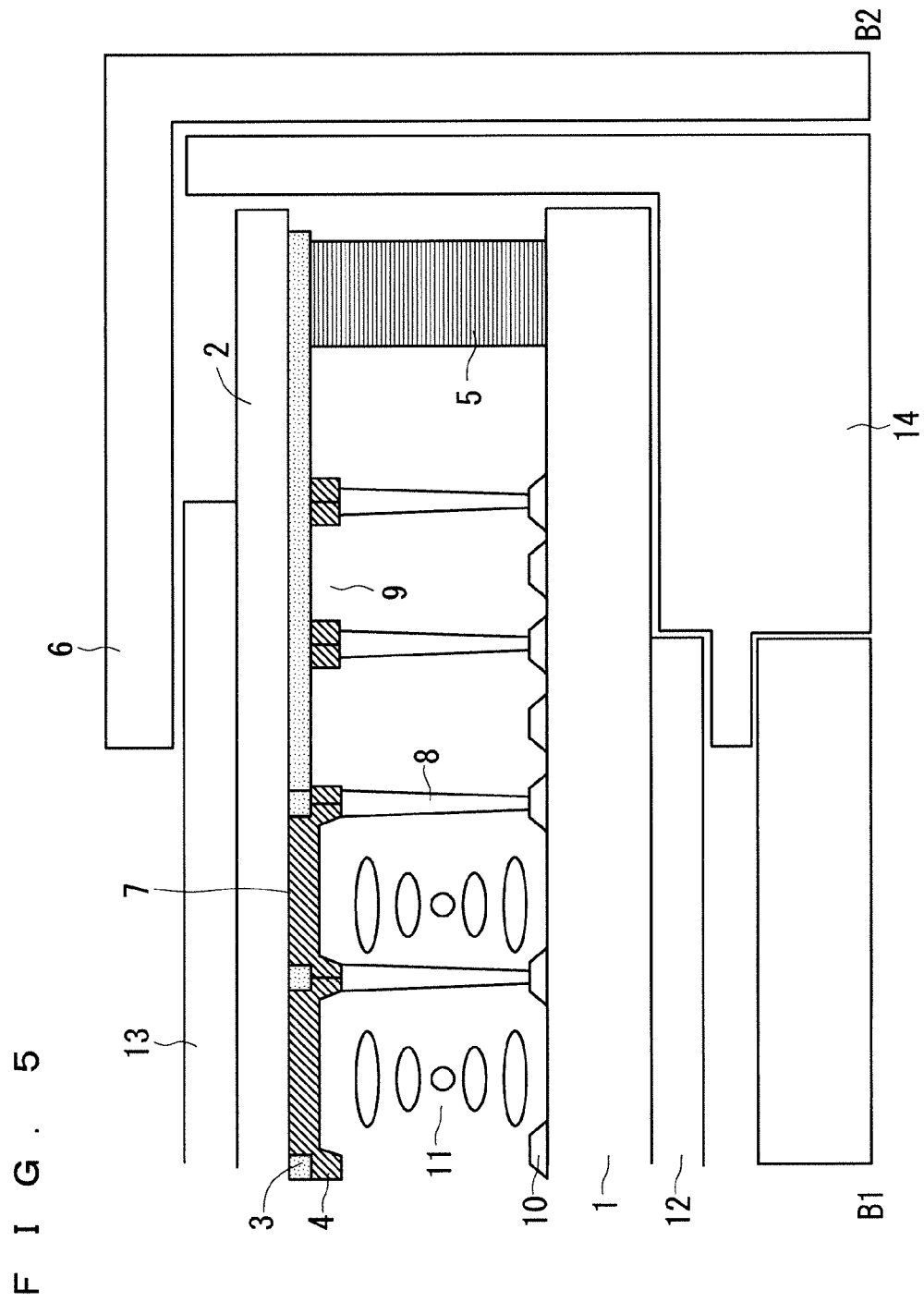
FIG. 5 is a cross-sectional view taken along the line B1-B2 in FIGS. 2 and 3.

FIG. 1 is a plan view showing one example of a configuration of a liquid crystal display panel of a liquid crystal display according to a first preferred embodiment of the present invention. FIG. 2 is an enlarged view of a portion that is enclosed by alternate long and short dashed lines in FIG. 1. FIG. 3 is a plan view of FIG. 2 as viewed from a TFT-array-substrate-1 side (back-surface side). FIG. 4 is a cross-sectional view taken along the line A1-A2 in FIGS. 2 and 3. FIG. 5 is a cross-sectional view taken along the line B1-B2 in FIGS. 2 and 3.

In FIGS. 1 and 2, the display-surface side is on the front side of the paper. In FIG. 3, the back-surface side is on the front side of the paper. (That is, the back-surface side is the side opposite to the display-surface side.) In FIGS. 4 and 5, the display-surface side is on the upper side of the paper.

As shown in FIGS. 1 to 5, the liquid crystal display panel mainly includes the TFT array substrate 1, a counter substrate 2, a black matrix 3 (light-shielding layer), a color material layer 4, a sealing material 5, columnar spacers 8, and polarizing plates 12 and 13.

The TFT array substrate 1 has an array of a plurality of pixels and TFT array wires 10 mainly including a plurality of gate wires (scanning signal lines) and a plurality of source wires (video signal lines).

The counter substrate 2 is located opposite to the TFT array substrate 1. On the surface of the counter substrate 2 on the TFT-array-substrate-1 side, the black matrix 3, the color material layer 4, and a counter conductive layer (not shown) are disposed.

The black matrix 3 is located on the surface of the counter substrate 2 on the TFT-array-substrate-1 side.

In the display region in which the pixels are provided, the black matrix 3 is provided to block the unnecessary light between ones of the pixels and includes openings 7 (first openings) that transmit the display light in the respective pixels. That is, the openings 7 are formed at the positions corresponding to the respective pixels in the display region. In the non-display region, meanwhile, the black matrix 3 is provided substantially in the whole area of the non-display region so that the light unnecessary for displaying can be entirely blocked. That is, in the non-display region, the black matrix 3 is formed in a solid manner. Note that, the periphery of the counter substrate 2 within the range from the edge inwardly to about 0.5 mm or less does not particularly affect the displaying. Thus, the black matrix 3 within the above range (within the range from the edge inwardly to about 0.5 mm or less) is preferably removed as appropriate so that no flaking occurs during the substrate division in the process of manufacturing.

The color material layer 4 is located on the counter substrate 2 through the openings 7 and on the black matrix 3. The color material layer 4 is formed in a solid manner in the display region and is formed to have openings 9 (second openings) as dummies in the non-display region.

The color material layer 4 in the non-display region is formed of the color material layer 4 that is common to the color material layer 4 in the display region. The color material layer 4 in the non-display region can be considered as the dummy color material layer 4 because it does not serve as a color filter for display light, which is the function of the color material layer 4 in the display region.

The color material layer 4 is assumed to be formed of any of the colors being red, blue, or green.

The sealing material 5 is located in the peripheral portions of the TFT array substrate 1 and the counter substrate 2 and holds liquid crystals 11 filled between the TFT array substrate 1 and the counter substrate 2.

In the display region and the non-display region, the columnar spacers 8 are regularly formed on an overlap mainly formed of the black matrix 3, the color material layer 4, and the counter conductive layer (not shown) and holds the gap (cell gap) between the TFT array substrate 1 and the counter substrate 2. That is, the columnar spacers 8 are extended between the color material layer 4 and the TFT array substrate 1.

In a case where the more uniform cell gap is required as in the liquid crystal displays employing the transverse electric field mode, an overcoat layer that is a planarization layer made of, for example, a resin film may be formed on the black matrix 3 and the color material layer 4 over the entire range of the display region and the non-display region, and then, the columnar spacers 8 may be formed on the overcoat layer that has been formed.

The polarizing plate 12 is located on the surface of the TFT array substrate 1 on the side opposite to the counter substrate 2. The polarizing plate 13 is located on the surface of the counter substrate 2 on the side opposite to the TFT array substrate 1.

As shown in FIG. 1, a front frame 6 is peripherally located, on the surface of the counter substrate 2 on the side (display-surface side) opposite to the TFT array substrate 1, to cover part of the non-display region. The front frame 6 holds, jointly with a mold frame 14, the polarizing plates 12 and 13 from above and below (see FIGS. 4 and 5).

As shown in FIGS. 1 and 2, in the display region, the openings 7 in the black matrix 3 are formed and the openings 7 are filled with the color material layer 4. In the non-display region, meanwhile, the openings 7 are not formed.

As shown in FIG. 3, in the display region, the color material layer 4 is formed in a stripe pattern that is even within the pixels (by so-called solid coating). In the non-display region, meanwhile, the color material layer 4 is formed in the pattern having the openings 9.

For example, in a case where the black matrix 3 and the color material layer 4 have the equal thicknesses, the openings 7 in the black matrix 3 and the openings 9 in the color material layer 4 are preferably formed into the identical or similar shape, or formed to have an equal area.

As shown in FIGS. 4 and 5, the openings 7 in the black matrix 3 are formed in the display region and the openings 9 in the color material layer 4 are formed in the non-display region. In a case where the black matrix 3 and the color material layer 4 are made of the homogeneous materials, the shape of the surface formed of the black matrix 3 and the color material layer 4 has the repetitive pattern including projections (projections made of the color material 4 formed to overlap on the black matrix 3) that correspond to the pixel pitch. The discontinuity of the repetitive pattern between the display region and the non-display region is small.

The resin film (also referred to as PS film) formed of resin applied generally by spin coating or the like is patterned into the columnar spacers 8 by photolithography. In the resin film formed by spin coating, the planarization effect in which the surface is substantially flattened (also referred to as leveling) is generated. In a case where the surface of the applied undercoating has the average height that is substantially different at different positions, the height of the surface of the resin film varies to some extent according to the difference in the average height of the surface, also causing a difference in the thickness of the resin film itself.

Meanwhile, in the first preferred embodiment, the shape of the surface of the resin-film undercoating applied to form the columnar spacers 8 (the shape of the surface formed of the black matrix 3 and the color material layer 4) has the pattern in which the discontinuity is small between the display region and the non-display region, thereby hardly causing any difference in the average height of the surface of the resin-film undercoating. Therefore, the resin film can be formed such that the thickness thereof does not differ between the display region and the non-display region. That is, the columnar spacers 8 that are formed by patterning the resin film having no difference in thickness between the display region and the non-display region can be formed into the height that does not differ between the display region and the non-display region. Therefore, in the first preferred embodiment, the openings 9 are provided in the non-display region and the average height of the surface of the resin-film undercoating applied to form the columnar spacers 8 is adjusted to be equal in the display region and the non-display region. Therefore, without adding any special process, the columnar spacers 8 are formed into the height that does not differ between the display region and the non-display region. Thus, the cell gap in the display region and in the non-display region can be kept uniform and prevented from changing, so that the display defects such as display unevenness and puddling can be prevented.

Second Preferred Embodiment

Figure 6:
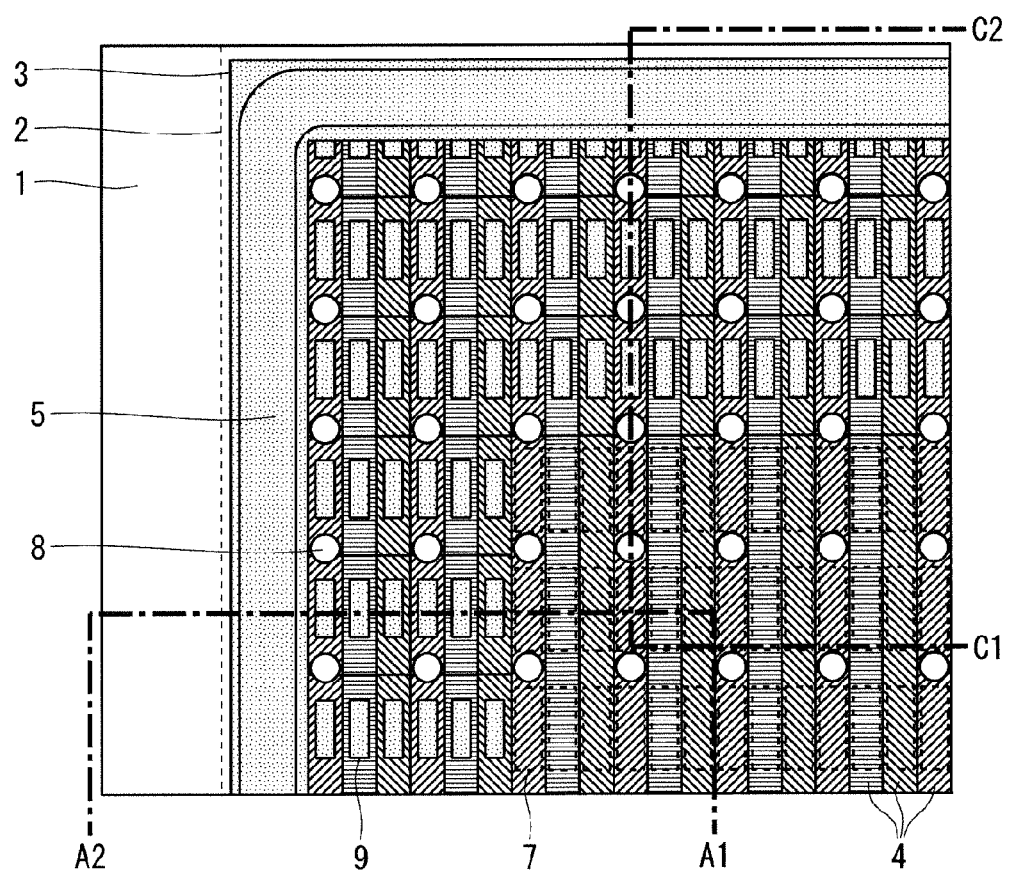
FIG. 6 is a plan view showing one example of a part of a liquid crystal display panel according to a second preferred embodiment of the present invention as viewed from the TFT-array-substrate side.
Figure 7:
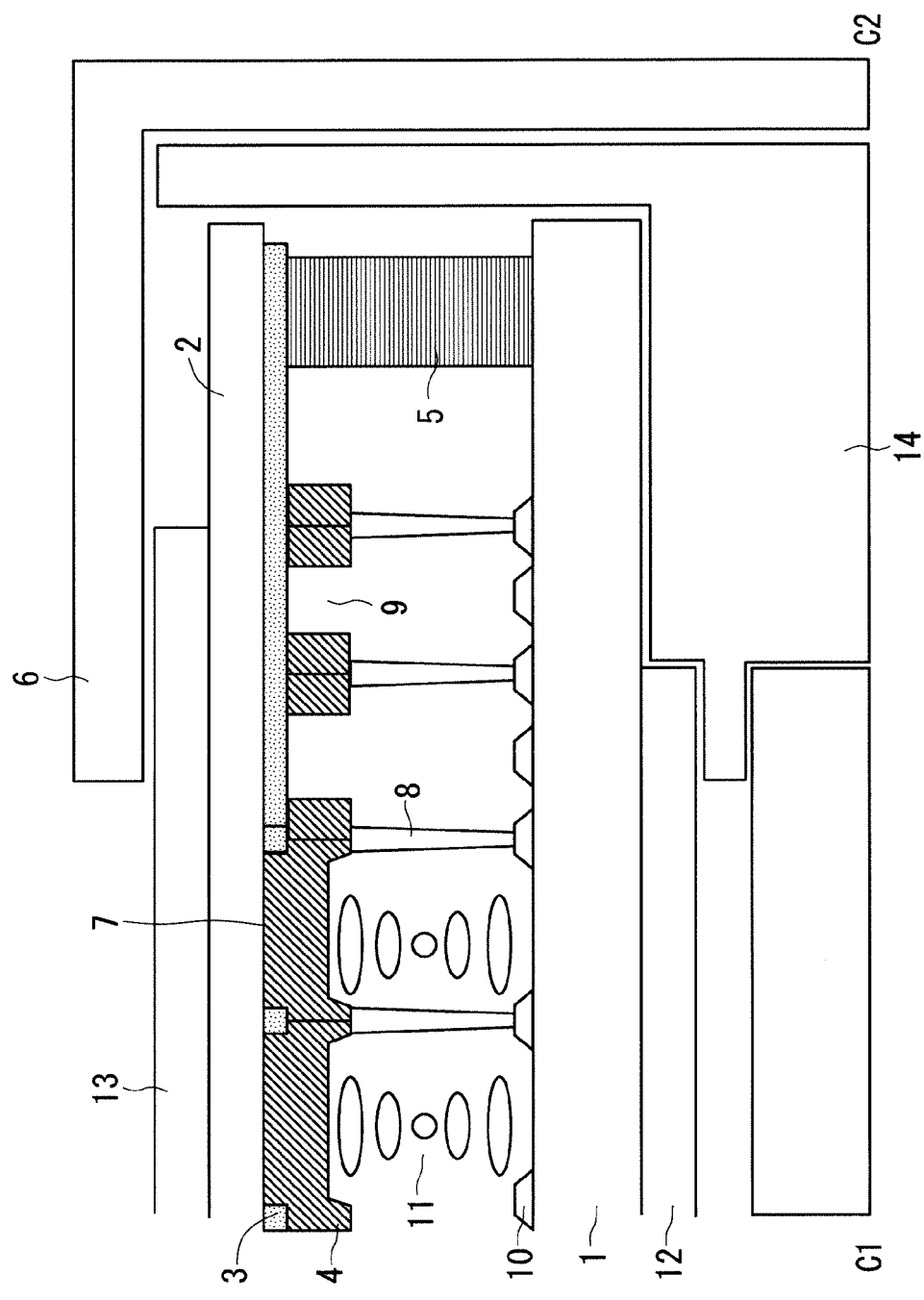
FIG. 7 is a cross-sectional view taken along the line C1-C2 in FIG. 6.

FIG. 6 is a plan view of the counter substrate 2 according to a second preferred embodiment of the present invention as viewed from the TFT-array-substrate-1 side (back-surface side). FIG. 7 is a cross-sectional view taken along the line C1-C2 in FIG. 6.

In FIG. 6, the back-surface side is on the front side of the paper. In FIG. 7, the display-surface side is on the upper side of the paper.

In the second preferred embodiment, the black matrix 3 and the color material layer 4 have different thicknesses, and accordingly, the openings 7 in the black matrix 3 and the openings 9 in the color material layer 4 have different opening dimensions (areas). The configuration except for the above is similar to that of the first preferred embodiment, and the description thereof is omitted.

Generally, the thickness of the color material layer 4 is changed according to the color characteristics (color reproducibility and color purity) required for the liquid crystal displays.

In FIG. 7, the black matrix 3 and the color material layer 4 are provided to have different thicknesses. In this case, the opening dimensions of the openings 9 in the color material layer 4 are adjusted such that the average thickness of the film serving as an undercoating in forming the columnar spacers 8 (the average thickness of the projections and recesses of the surface formed of the black matrix 3 and the color material layer 4) are the same in the display region and in the non-display region.

The openings 9 in the color material layer 4 formed in the non-display region do not affect the transmittance of the light (display light) that contributes to the displaying, so that the opening dimensions of the openings 9 can be adjusted freely to some extent. Thus, by adjusting the opening dimensions of the openings 9, the average thickness of the undercoating in forming the columnar spacers 8 is equalized in the display region and the non-display region, so that the columnar spacers 8 having the same height in the display region and the non-display region can be formed.

FIGS. 6 and 7 show an example in which the thickness of the color material layer 4 is larger than the thickness of the black matrix 3. In this case, as shown in FIG. 6, the opening dimensions are adjusted such that the opening dimensions of the opening 9 in the color material 4 formed in the non-display region are smaller than the opening dimensions of the opening 7 in the black matrix 3 formed in the display region. That is, in a case where the black matrix 3 and the color material layer 4 have different thicknesses, the areas of the openings 7 and the openings 9 are adjusted such that the openings in either the black matrix layer 3 or the color material layer 4 that is thicker than the other layer have the areas smaller than those of the openings in the other layer.

In the above description, regarding the difference in the height of the columnar spacers 8 between the display region and the non-display region caused by the difference between the thickness of the black matrix 3 and the thickness of the color material layer 4, the opening dimensions of the openings 9 in the color material layer 4 formed in the non-display region are adjusted, so that the heights of the columnar spacers 8 formed in the non-display region are equal to the heights of the columnar spacers 8 formed in the display region. That is, the opening dimensions of the openings 9 in the color material layer 4 in the non-display region are changed relative to the opening dimensions of the openings 7 in the black matrix 3 in the display region, whereby the heights of the columnar spacers 8 in the non-display region can be relatively freely adjusted.

Specifically, for example, as shown in FIGS. 8 and 9, in the vicinity of the positions at which the opening dimensions of the openings 9 in the color material layer 4 in the non-display region are set to be smaller, the column spacers 8 can be adjusted to be higher. Meanwhile, in the vicinity of the positions at which the opening dimensions of the openings 9 in the color material layer 4 are set to be larger, the column spacers 8 can be adjusted to be lower.

By adjusting the opening dimension of the opening 9 in the color material layer 4 at a specific position in the non-display region, the height of the columnar spacer 8 at the specific position can be adjusted relatively freely.

In general, to vary the height of the columnar spacers 8 from position to position in a single substrate, for example, patterning needs to be performed several times or the halftone process needs to be employed. However, by using the method according to the second preferred embodiment described above, the height of the columnar spacers 8 can be relatively easily adjusted for each desired position without adding any special process (such as the multiple patterning processes or the halftone process).

Therefore, in the second preferred embodiment, even if the black matrix 3 and the color material layer 4 have different thicknesses, the height of the columnar spacers 8 can be relatively easily adjusted without adding any special process. Thus, the cell gap in the display region and in the non-display region can be kept uniform and prevented from changing, so that the display defects such as display unevenness and puddling can be prevented.

Third Preferred Embodiment

Figure 10:
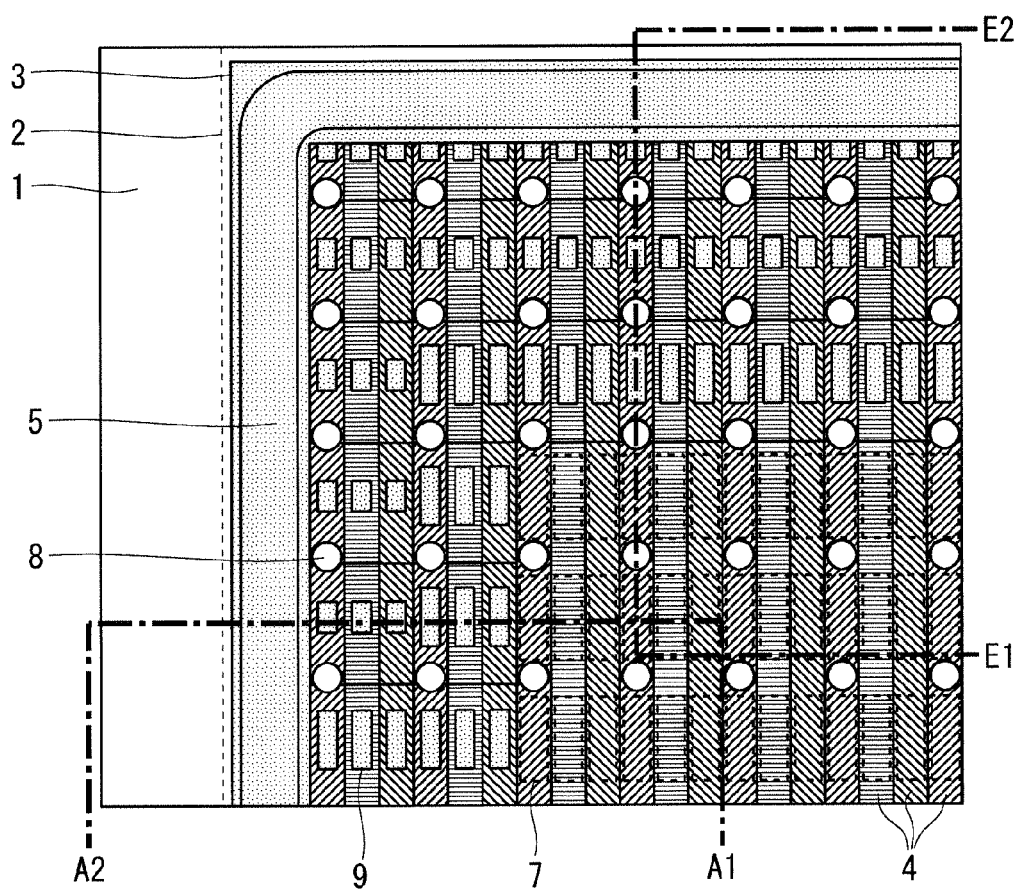
FIG. 10 is a plan view showing one example of a part of a liquid crystal display panel according to a third preferred embodiment of the present invention as viewed from the TFT-array-substrate side.
Figure 11:
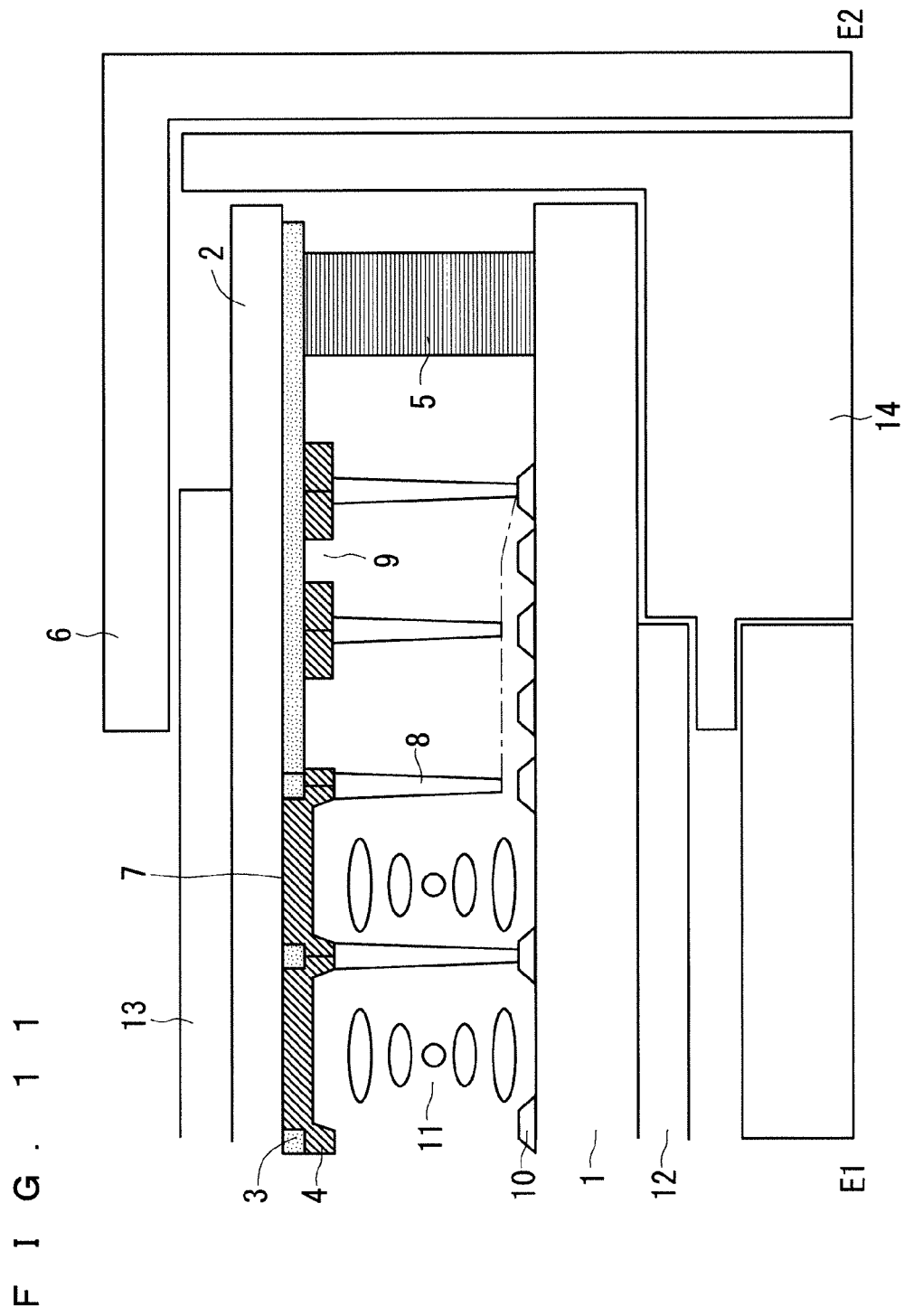
FIG. 11 is a cross-sectional view taken along the line E1-E2 in FIG. 10.

FIG. 10 is a plan view of the counter substrate 2 according to a third preferred embodiment of the present invention as viewed from the TFT-array-substrate-1 side (back-surface side). FIG. 11 is a cross-sectional view taken along the line E1-E2 in FIG. 10.

In FIG. 10, the back-surface side is on the front side of the paper. In FIG. 11, the display-surface side is on the upper side of the paper.

In the third preferred embodiment, the opening dimensions (areas) of the openings 9 in the color material layer 4 in the non-display region are different at different positions at which the opening 9 are formed, and particularly, the opening dimensions (areas) of the openings 9 gradually become smaller from the display-region side toward the side opposite to the display region. The configuration except for the above is similar to that of the first preferred embodiment, and the description thereof is omitted.

As shown in FIGS. 10 and 11, in the non-display region, the openings 9 in the color material layer 4 are formed such that the opening dimensions thereof gradually become smaller as the openings 9 are apart from the display region. In this case, the columnar spacers 8 formed on the color material layer 4 become higher as they are apart from the display region (as they approach the sealing material 5). If the heights of the columnar spacers 8 in the non-display region in the vicinity of the display region are higher, they are not in balance with the heights of the columnar spacers 8 in the display region (the heights of the columnar spacers 8 suddenly change between the display region and the non-display region), whereby the cell gap cannot be kept uniform, causing display defects in the display region in the vicinity of the non-display region. However, as shown in FIGS. 10 and 11, if the change in the cell gap (that is, the change in the heights of the columnar spacers 8) between the display region and the non-display region is gradual, the change is hardly recognized as a display defect.

In the liquid crystal display including a touch panel or a cover glass disposed on the display-surface side, meanwhile, when the sealing material 5 is cured, the columnar spacers 8 that are pressed down by the front frame 6 (the columnar spacers 8 formed in the vicinity of the sealing material 5) are designed to have the compressive deformation amounts that are larger than those of the columnar spacers 8 in the display region, to thereby acquire the resistance to the external force applied through the front frame 6. That is, in the non-display region, if the columnar spacers 8 in the vicinity of the sealing material 5 are formed to be relatively higher than the others, the columnar spacers 8 are compressed to the point where the columnar spacers 8 have the height equal to the cell gap in the vicinity of the display region, thereby being compressed with the compression ratio relatively higher than that of others (being held in a state where, for example, what is referred to as resilience in springs is kept as residual stress). Therefore, the columnar spacers 8 formed in the vicinity of the sealing material 5 can acquire the enhanced resistance to the partially-applied external force in the vicinity of the sealing material 5.

Therefore, in the third preferred embodiment, the display defects in the display region in the vicinity of the non-display region can be suppressed and the columnar spacers 8 having the heights that provide the resistance to the external force applied through the front frame 6 can be formed without adding any special process (such as the multiple patterning processes or the halftone process). Thus, the cell gap in the display region and in the non-display region is kept uniform and prevented from changing, so that the display defects such as display unevenness and puddling can be prevented.

Fourth Preferred Embodiment

Figure 12:
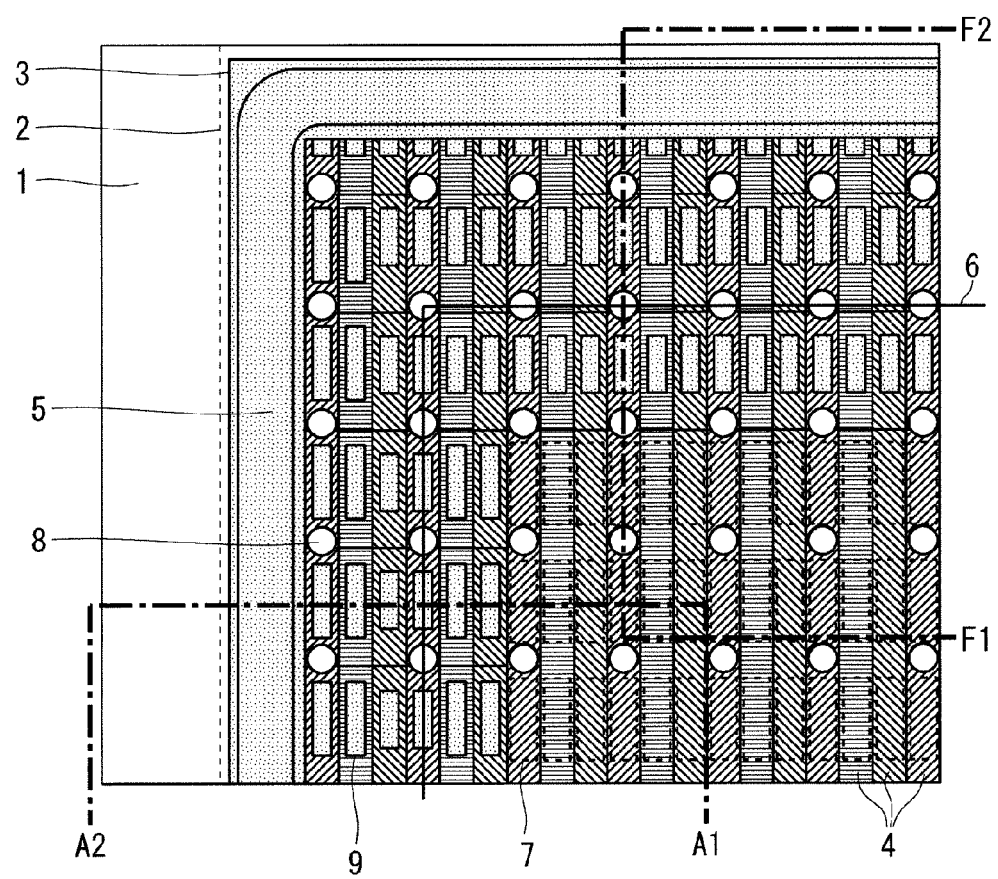
FIG. 12 is a plan view showing one example of a part of a liquid crystal display panel according to a fourth preferred embodiment of the present invention as viewed from the TFT-array-substrate side.

FIG. 12 is a plan view of the counter substrate 2 according to a fourth preferred embodiment of the present invention as viewed from the TFT-array-substrate-1 side (back-surface side). FIG. 13 is a cross-sectional view taken along the line F1-F2 in FIG. 12.

In FIG. 12, the back-surface side is on the front side of the paper. In FIG. 13, the display-surface side is on the upper side of the paper.

In the fourth preferred embodiment, the opening dimensions (areas) of the openings 9 in the color material layer 4 gradually become smaller from the display-region side and the side opposite to the display-region side toward the position in the non-display region that corresponds to the end of the front frame 6. The configuration except for the above is similar to that of the first preferred embodiment, and the description thereof is omitted.

In the liquid crystal display including a touch panel or a cover glass disposed on the display-surface side, the touch panel or the cover glass is often disposed onto the front frame 6 via a double-sided adhesive tape. When such a liquid crystal display is used, for example, the pressing force to the touch panel concentrates on the end of the front frame 6 on the display-surface side (on the non-display region) in some cases.

Also, in the liquid crystal display including no touch panel nor cover glass disposed thereon, the pressing force applied by the housing that covers the liquid crystal display concentrates on the end of the front frame 6 on the display-surface side in some cases.

In FIGS. 12 and 13, the opening dimensions (areas) of the openings 9 in the color material layer 4 located at the position in the non-display region at which the external force is predicted to concentrate as described above (the end of the front frame 6 on the non-display region in the above case) are adjusted to be smaller, to thereby increase the heights of the columnar spacers 8 formed at the position in which the external force is predicted to concentrate.

As described above, the columnar spacers 8 formed at the position corresponding to the end of the front frame 6 on the non-display region are set to be relatively higher than the others, so that the columnar spacers 8 are compressed to the point where the columnar spacers 8 have the height equal to the cell gap in the vicinity of the display region, thereby being compressed with the compression ratio relatively higher than that of others (being held in a state where, for example, what is referred to as resilience in springs is kept as residual stress). Therefore, the columnar spacers 8 formed at the position corresponding to the end of the front frame 6 on the non-display region can acquire the enhanced resistance to the partially (locally)-applied external force at the end of the front frame 6 on the non-display region.

Therefore, in the fourth preferred embodiment, the columnar spacers 8 having the height that provides the resistance to the partially-applied external force at the end of the front frame 6 on the non-display region can be formed. Thus, the cell gap in the display region and in the non-display region is kept uniform and prevented from changing, so that the display defects such as display unevenness and puddling can be prevented.

Fifth Preferred Embodiment

Figure 15:
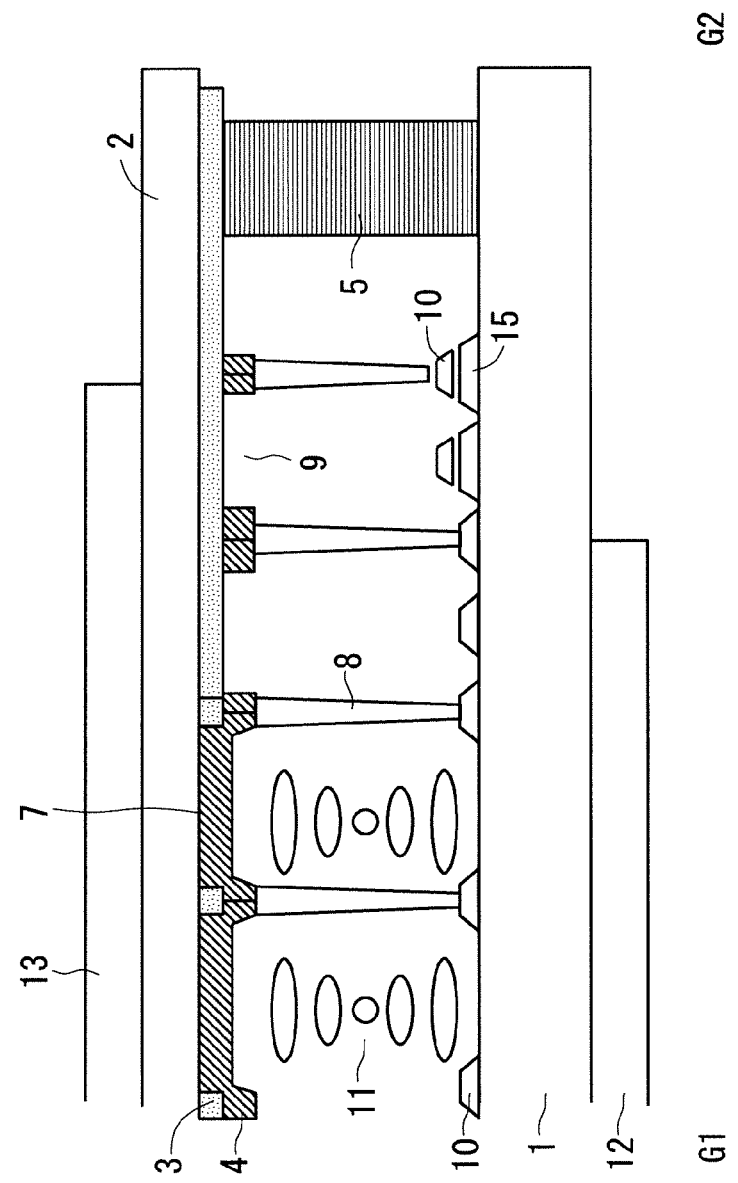
FIG. 15 is a cross-sectional view taken along the line G1-G2 in FIG. 14.

FIG. 14 is a plan view of the counter substrate 2 according to a fifth preferred embodiment of the present invention as viewed from the TFT-array-substrate-1 side (back-surface side). FIG. 15 is a cross-sectional view taken along the line G1-G2 in FIG. 14.

In FIG. 14, the back-surface side is on the front side of the paper. In FIG. 15, the display-surface side is on the upper side of the paper.

In the fifth preferred embodiment, in a case where the surface of the TFT array substrate 1 on the counter-substrate-2 side has steps, the opening dimensions (areas) of the openings 9 in the color material layer 4 change according to the steps corresponding to the columnar spacers 8. The configuration except for the above is similar to that of the first preferred embodiment, and the description thereof is omitted. Here, the steps refer to the thicknesses of the TFT array wires 10 and TFT array wires 15 disposed on the TFT array substrate 1 that are described below.

In the non-display region of the TFT array substrate 1, the signal wires of various thicknesses mainly including the routing wires connected to a plurality of gate wires or a plurality of source wires, the common potential wires, or the anti-static electricity circuitry are densely disposed, in which a plurality of wires are disposed to overlap (be laminated on) one another in some positions. Consequently, in some cases, the thicknesses of the wires on which the columnar spacers 8 are to be disposed in the display region and the thicknesses of the wires on which the columnar spacers 8 are to be disposed in the non-display region are different, which is likely to cause display defects.

In response to the above problem, in the fifth preferred embodiment, as shown in FIGS. 14 and 15, assuming that the thicknesses of the wires on which the columnar spacers 8 are to be disposed in the vicinity of the sealing material 5 (the total thicknesses of the TFT array wires 10 and the TFT array wires 15) are larger than the thicknesses of the wires (the thicknesses of the TFT array wires 10) in the display region, the opening dimensions of the openings 9 in the color material layer 4 in the vicinity of the sealing material 5 are made larger, so that the columnar spacers 8 are adjusted to be lower. That is, the opening dimensions (areas) of the openings 9 in the color material layer 4 increase with increase in size of the steps (with increase in the thicknesses of the TFT array wires 10 and the TFT array wires 15).

Therefore, in the fifth preferred embodiment, the heights of the columnar spacers 8 are adjusted according to the thicknesses (steps) of the TFT array wires 10 and the TFT array wires 15 disposed on the TFT array substrate 1. This allows the cell gap in the display region and in the non-display region to be kept uniform and prevented from changing, so that the display defects such as display unevenness and puddling can be prevented.

In recent years, there has been a growing demand for the liquid crystal displays including narrower frames, and thus, the non-display region are increasingly confined. The signal wires are densely disposed in such a confined non-display region. Therefore, it is difficult to design the arrangement of the columnar spacers in the non-display region such that the steps (the surface heights) of the TFT array substrate on which the columnar spacers are to be disposed become equal in the display region and the non-display region. The above-described method according to the fifth preferred embodiment can prevent the display defects in the liquid crystal displays including the narrow-frame liquid crystal displays, thus being more effective in dealing with the above problem.

In the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display comprising:
an array substrate having an array of a plurality of pixels;
a counter substrate located opposite to said array substrate;
a sealing material located at a periphery of the array substrate and the counter substrate;
a light-shielding layer located on a surface of said counter substrate on said array substrate side, said light-shielding layer having, in a display region in which said pixels are disposed, a plurality of first openings formed at positions corresponding to said pixels, said light-shielding layer being formed in a solid manner in a non-display region that is a periphery of said display region and is located between said display region and said sealing material;
a color material layer located on said counter substrate through said plurality of first openings and on said light-shielding layer, said color material layer being formed in a solid manner in said display region and being formed to have a plurality of second openings as dummies in said non-display region; and
a plurality of columnar spacers extended between said color material layer and said array substrate, the plurality of columnar spacers being in direct contact with said color material layer,
wherein said plurality of second openings are arranged in an array.

2. The liquid crystal display according to claim 1, wherein said plurality of first openings and said plurality of second openings have an identical or similar shape.

3. The liquid crystal display according to claim 1, wherein in a case where said light-shielding layer and said color material layer differ in thickness, one of said layers having a larger thickness has a smaller area of said openings.

4. The liquid crystal display according to claim 1, wherein said plurality of second openings have different areas at different positions at which said plurality of second openings are formed.

5. The liquid crystal display according to claim 4, wherein said areas of said plurality of second openings decrease from the said display region side toward the side opposite to said display region.

6. The liquid crystal display according to claim 4, further comprising a front frame peripherally located, on a surface of said counter substrate on the side opposite to said array substrate, to cover part of said non-display region,
wherein said areas of said plurality of second openings decrease from the said display region side and the side opposite to said display region toward a position corresponding to an end of said front frame on said non-display region.

7. The liquid crystal display according to claim 4, wherein in a case where a surface of said array substrate on said counter substrate side has steps, said areas of said plurality of second openings change according to said steps corresponding to said plurality of columnar spacers.

8. The liquid crystal display according to claim 7, wherein said areas of said plurality of second openings increase as sizes of said steps increase.

9. A liquid crystal display comprising:
an array substrate having an array of a plurality of pixels;
a counter substrate located opposite to said array substrate;
a light-shielding layer located on a surface of said counter substrate on said array substrate side, said light-shielding layer having, in a display region in which said pixels are disposed, a plurality of first openings formed at positions corresponding to said pixels, said light-shielding layer being formed in a solid manner in a non-display region that is a periphery of said display region and is adjacent to said display region;
a color material layer located on said counter substrate through said plurality of first openings and on said light-shielding layer, said color material layer being formed in a solid manner in said display region and being formed to have a plurality of second openings as dummies in said non-display region; and
a plurality of columnar spacers extended between said color material layer and said array substrate,
wherein said plurality of second openings have different areas at different positions at which said plurality of second openings are formed, and wherein said areas of said plurality of second openings decrease from the said display region side toward the side opposite to said display region.

10. A liquid crystal display comprising:

an array substrate having an array of a plurality of pixels;

a counter substrate located opposite to said array substrate;

a light-shielding layer located on a surface of said counter substrate on said array substrate side, said light-shielding layer having, in a display region in which said pixels are disposed, a plurality of first openings formed at positions corresponding to said pixels, said light-shielding layer being formed in a solid manner in a non-display region that is a periphery of said display region and is adjacent to said display region;

a color material layer located on said counter substrate through said plurality of first openings and on said light-shielding layer, said color material layer being formed in a solid manner in said display region and being formed to have a plurality of second openings as dummies in said non-display region; and a plurality of columnar spacers extended between said color material layer and said array substrate, wherein said plurality of second openings have different areas at different positions at which said plurality of second openings are formed, and wherein in a case where a surface of said array substrate on said counter substrate side has steps, said areas of said plurality of second openings change according to said steps corresponding to said plurality of columnar spacers.

* * * * *